(12) United States Patent
Kabuo

(10) Patent No.: US 6,260,136 B1
(45) Date of Patent: Jul. 10, 2001

(54) SUBSTITUTE REGISTER FOR USE IN A HIGH SPEED DATA PROCESSOR

(75) Inventor: Hideyuki Kabuo, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/135,487

(22) Filed: Aug. 18, 1998

(30) Foreign Application Priority Data

Aug. 20, 1997 (JP) .................................................. 9-223220

(51) Int. Cl.[7] ....................................................... G06F 9/302
(52) U.S. Cl. ............................................. 712/217; 712/221
(58) Field of Search ..................................... 712/222, 225, 712/228, 35, 1, 11, 221, 218, 217; 708/523, 491, 625, 578, 524; 711/119, 5, 491

(56) References Cited

U.S. PATENT DOCUMENTS

| | | | | |
|---|---|---|---|---|
| 5,126,964 | * | 6/1992 | Zurawski | 708/625 |
| 5,260,897 | * | 11/1993 | Toriumi et al. | 708/524 |
| 5,954,811 | * | 9/1999 | Garde | 712/35 |
| 5,987,597 | * | 11/1999 | Miura et al. | 712/222 |
| 6,026,421 | * | 2/2000 | Sabin et al. | 708/523 |

\* cited by examiner

Primary Examiner—Richard L. Ellis
(74) Attorney, Agent, or Firm—Eric J. Robinson; Nixon Peabody LLP

(57) ABSTRACT

In addition to a register file having four general-purpose registers each for storing data, an arithmetic and logic unit for executing an addition instruction, a subtraction instruction, or the like, and a multiplier unit for executing a multiplication instruction, there are provided a controller and a substitute register for storing only data representing the result of operation performed by the multiplier unit in place of any of the four general-purpose registers in the register file. The controller controls the writing and reading of data in and from the register file and the writing and reading of data in and from the substitute register based on a multiplication tag indicative of the one of the four general-purpose registers in place of which the substitute register stores the data representing the result of multiplication and on a multiplication execute flag indicative of whether the data stored in the substitute register is effective or ineffective.

7 Claims, 7 Drawing Sheets

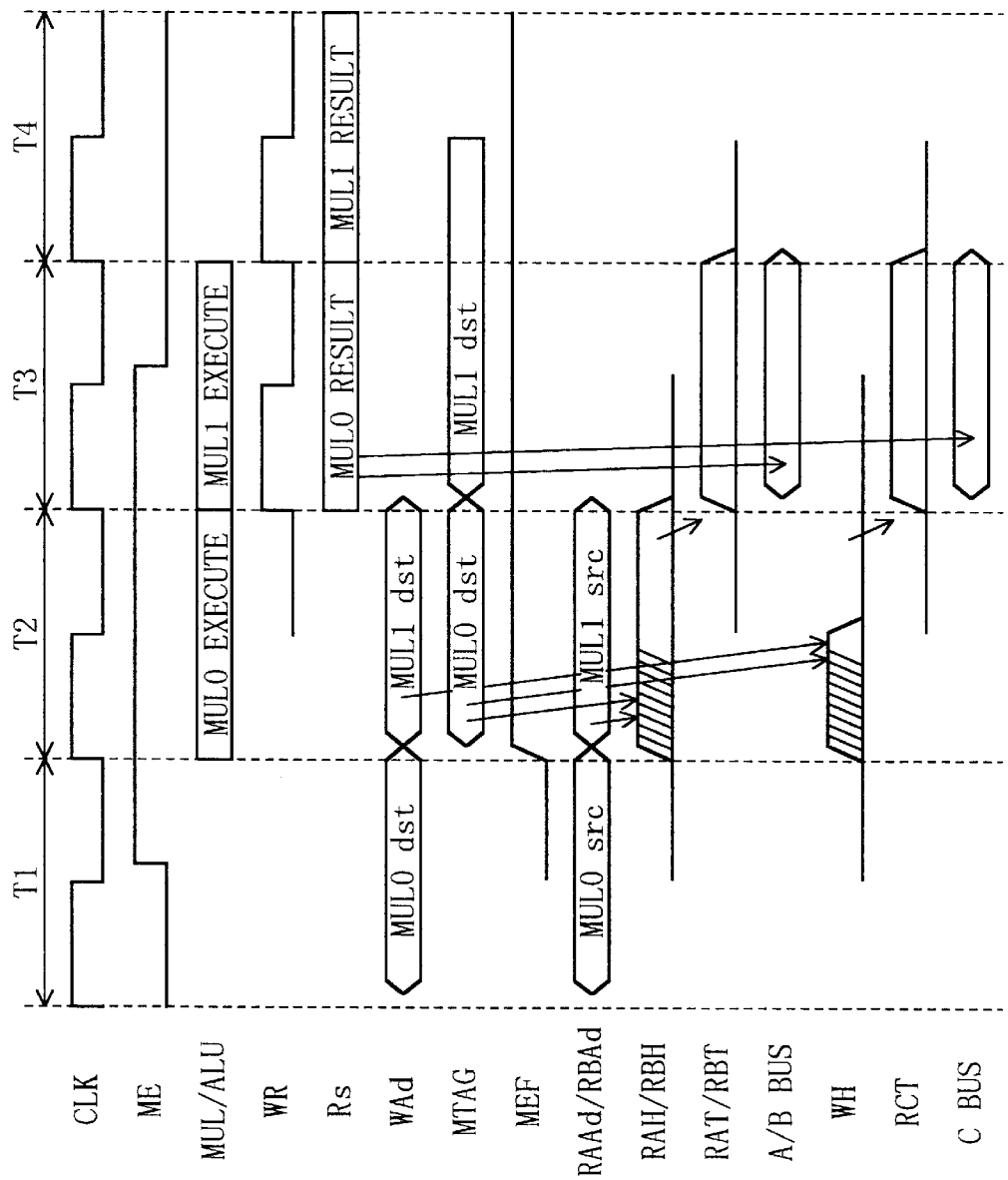

SUBSTITUTE REGISTER FOR USE IN A HIGH SPEED DATA PROCESSOR

BACKGROUND OF THE INVENTION

The present invention relates to a data processor comprising a register file and a plurality of operational units.

With recent advances in LSI technology, a high-performance digital signal processor has been implemented on a single chip to perform complicated data processing including addition, subtraction, and multiplication. In such a field of application as mobile telephone, high-speed data processing is particularly needed to perform compression/decompression of a large amount of information.

A known example of a high-speed data processor uses a pipeline control system, which comprises a small-capacity and high-speed register file in addition to a large-capacity memory such as a SRAM (static random access memory) and a low-speed memory such as a ROM (read-only memory). The pipeline data processor is composed of the register file having a plurality of general-purpose registers each for storing data and a plurality of operational units including an arithmetic and logic unit and a multiplier unit, which are connected to each other via buses. In the pipeline data processor, the high-speed register file is used to store data for operation. For example, the arithmetic and logic unit receives two operands from the register file and performs the addition of the two operands in response to an addition instruction. Data representing the result of the addition is written in a designated one of the general-purpose registers in the resister file. The multiplier unit receives two operands from the register file and performs the multiplication of the two operands in response to a multiplication instruction. Data representing the result of the multiplication is written in a designated one of the general-purpose registers in the register file.

In general, a multiplication process requires a longer time than an addition/subtraction process. Therefore, the multiplier unit forms a critical path in a conventional pipeline data processor so that the upper-limit frequency of a pipeline clock is determined by the multiplier unit. Besides, the time required to write the result of the operation performed by the multiplier unit in the register file via a bus is not negligible because it causes a serious delay in data transfer via the bus forming a long path.

SUMMARY OF THE INVENTION

It is therefore an object of the present invention to improve the operational speed of a data processor comprising a register file and a plurality of operational units.

To attain the object, the present invention provides a substitute register for storing data representing the result of operation performed by a specified one of the plurality of operational units (e.g., multiplier unit) in place of any of a plurality of general-purpose registers in the register file, which is disposed in the vicinity of the specific operational unit. The arrangement saves time required to write the data representing the result of the operation performed by the specific operational unit in the register file via a bus. The general-purpose register in place of which the substitute register stores the data representing the result of the operation performed by the specific operational unit is indicated by a tag stored in a tag register. When an instruction accompanied by a read address for specifying from which one of the general-purpose registers data should be read is given and the read address coincides with the tag of the tag register, the data stored in the substitute register is read therefrom.

BRIEF DESCRIPTION OF THE DRAWINGS

FIG. 7 is a timing chart illustrating another exemplary operation of the data processor of FIG. 1.

DETAILED DESCRIPTION OF THE INVENTION

Figure 1:
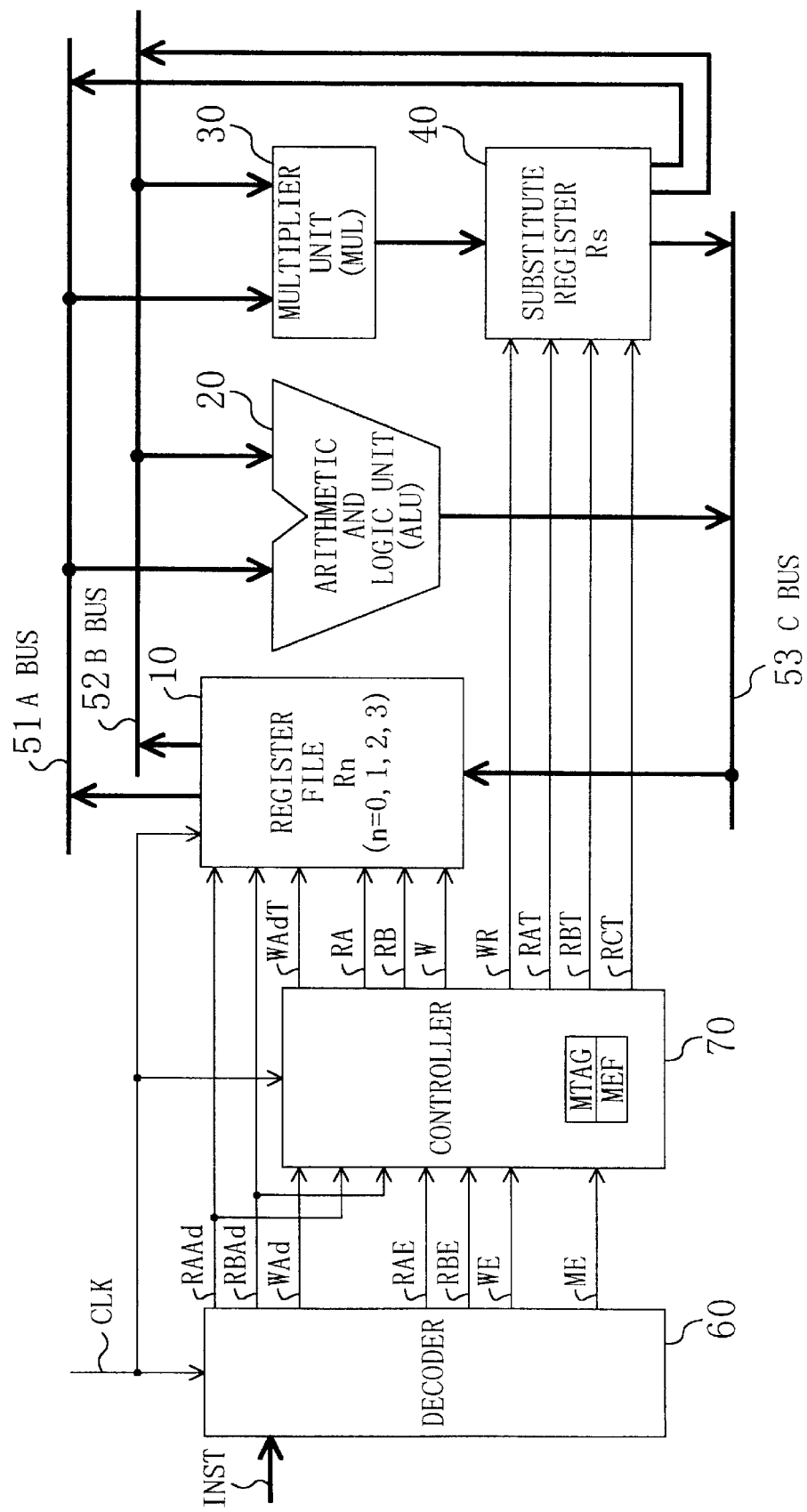
FIG. 1 is a block diagram showing an exemplary structure of a data processor according to the present invention.

Referring now to the drawings, the embodiment of the present invention will be described.

FIG. 1 shows an exemplary structure of a data processor according to the present invention, which performs data processing by sequentially executing given instructions INST. The data processor of FIG. 1 comprises: a register file 10 having four general-purpose registers Rn (n=0, 1, 2, and 3) each for storing data; an arithmetic and logic unit (ALU) 20 for executing an addition instruction, a subtraction instruction, or the like; a multiplier unit (MUL) 30 for executing a multiplication instruction; a substitute register (Rs) 40 for storing data representing the result of the operation performed by the multiplier unit 30 in place of any of the four general-purpose registers in the register file 10; an A bus 51; a B bus 52; and a C bus 53. The resister file 10 has the functions of transmitting operands to the A bus 51 and/or the B bus 52 and storing data on the C bus 53 in any of the general-purpose registers. The arithmetic and logic unit 20 receives respective operands from the A bus 51 and from the B bus 52 and performs, e.g., the addition of the two operands in response to an addition instruction. Data representing the result of the addition is written via the C bus 53 in a designated one of the general-purpose registers in the register file 10. The multiplier unit 30 receives respective operands from the A bus 51 and from the B bus 52 and performs the multiplication of the two operands in response to a multiplication instruction. Data representing the result of the multiplication is written constantly in the substitute register 40. The data stored in the substitute register 40 can be supplied to any of the A bus 51, the B bus 52, and the C bus 53.

The data processor of FIG. 1 further comprises a decoder 60 for decoding a given instruction INST and a controller 70 for controlling the writing of data in the register file 10, the reading of data stored in the register file 10, the writing of data in the substitute register 40, and the reading of data stored in the substitute register 40. The decoder 60 supplies, in response to the given instruction INST, a first read address RAAd, a second read address RBAd, a write address WAd, a first read enable signal RAE, a second read enable signal RBE, a write enable signal WE, and a multiplication execute signal ME. The controller 70 receives these signals and supplies the register file 10 with a write address WAdT, a read-to-A-bus signal RA, a read-to-B-bus signal RB, and a write signal W. The register file 10 receives the first and second read addresses RAAd and RBAd supplied from the decoder 10. The controller 70 supplies the substitute register 40 with a write signal WR, a read-to-A-bus signal RAT, a read-to-B-bus signal RBT, and a read-to-C-bus signal RCT. It is to be noted that a common clock signal CLK is supplied to each of the register file 10, the decoder 60, and the controller 70 for the synchronous operations thereof. The controller 70 has a multiplication tag MTAG indicative of the one of the four general-purpose registers in place of which the substitute register 40 stores data representing the result of multiplication and a multiplication execute flag MEF indicative of whether the data stored in the substitute register 40 is effective or ineffective.

Figure 2:
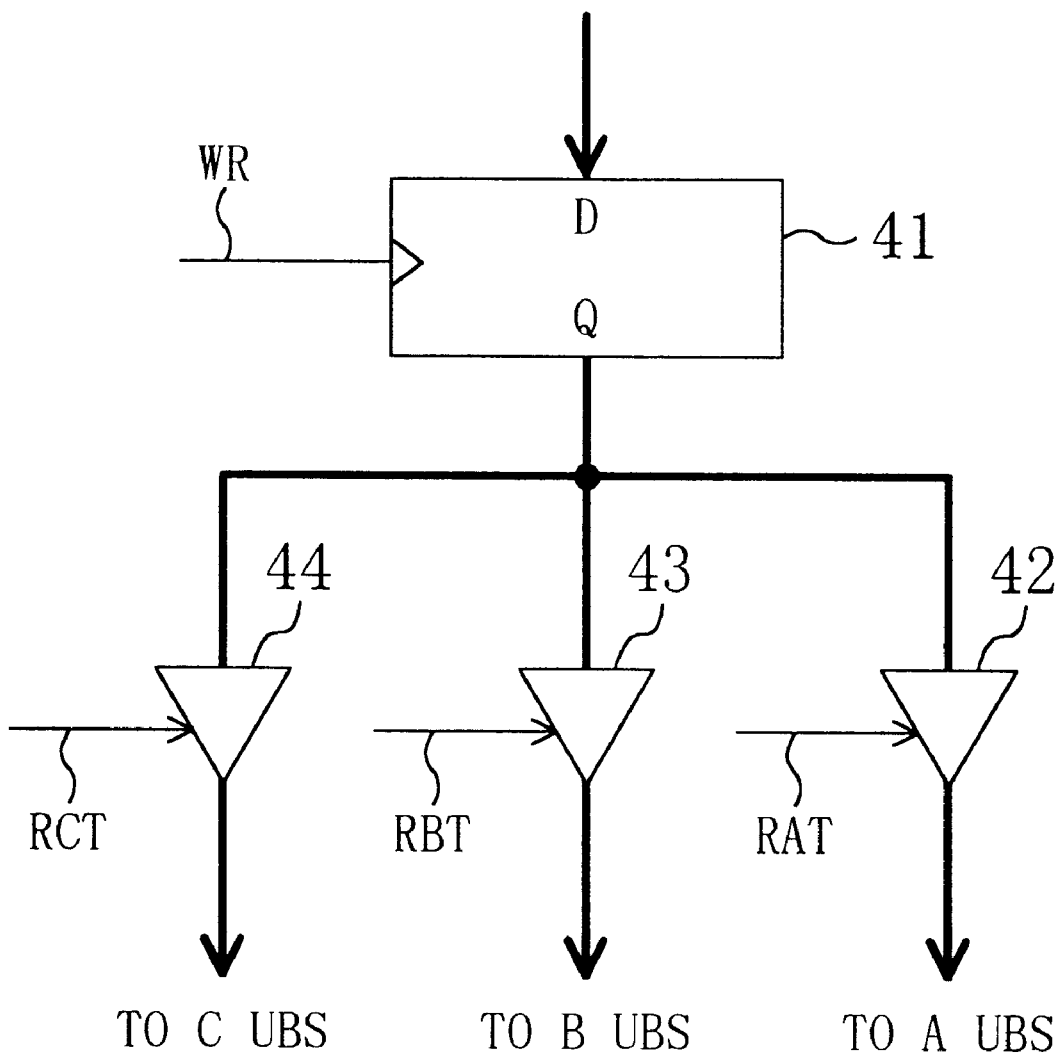
FIG. 2 is a circuit diagram showing the internal structure of a substitute register of FIG. 1.

FIG. 2 shows the internal structure of the substitute register 40, in which are depicted: a register 41 for storing the result of multiplication in synchronization with the rising edge of the write signal WR; an output gate 42 to the A bus; an output gate 43 to the B bus; and an output gate 44 to the C bus. The output gates 42, 43, and 44 are activated in response to the respective read-to-A-bus signal RAT, read-to-B-bus signal RBT, and read-to-C-bus signal RCT.

Figure 3:
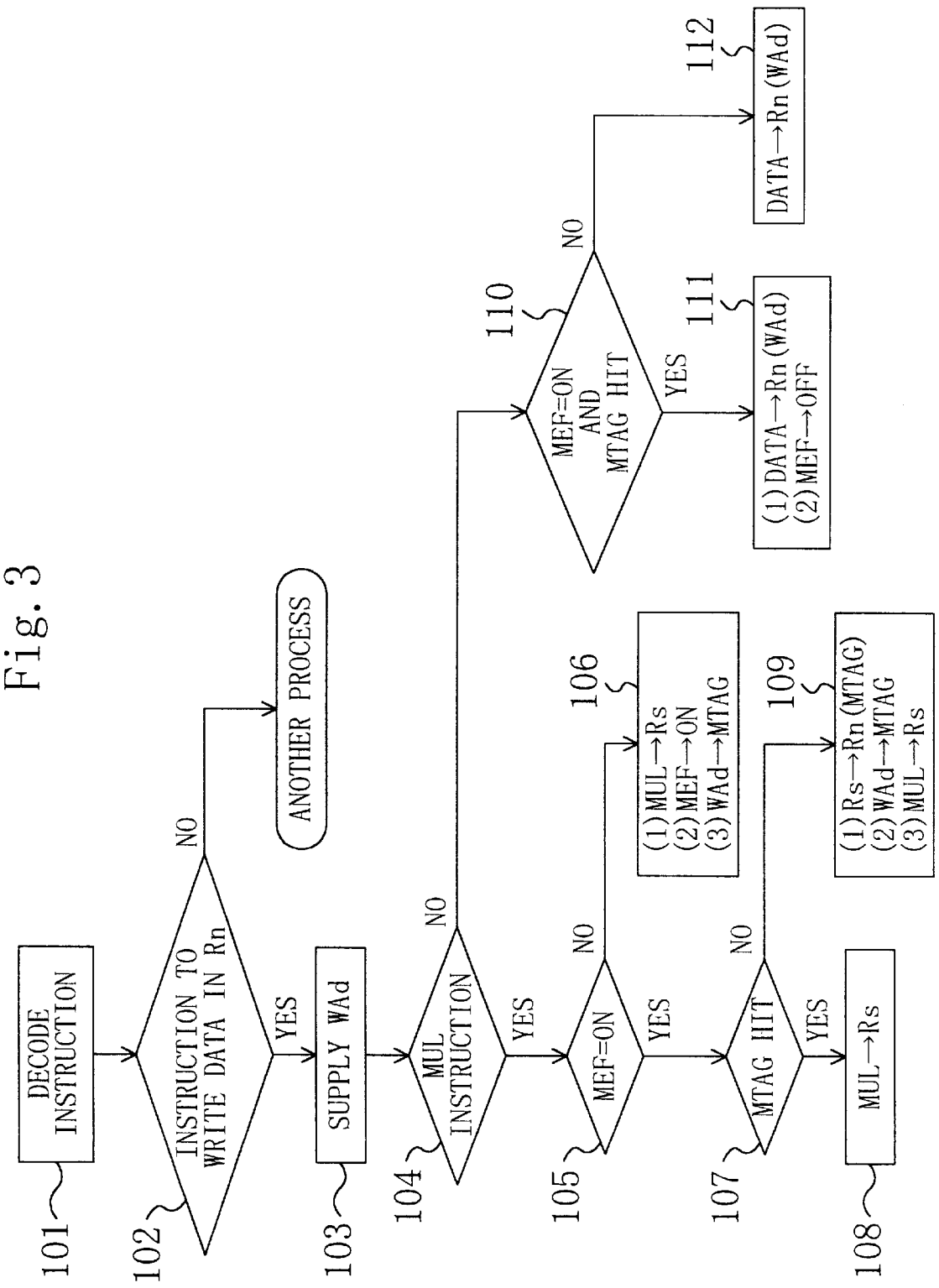
FIG. 3 is a flow chart illustrating the operation of writing data in a resister file and in the substitute register of FIG. 1.

FIG. 3 shows the operation of writing data in the register file 10 and in the substitute register 40, which will be described sequentially. First, in Step 101, the given instruction INST is decoded by the decoder 60. If the instruction INST of concern is not an instruction to write data in the register file 10, the operation proceeds from Step 102 to another process. If the instruction INST of concern is to write data in the register file 10, the write address WAd for specifying one of the four general-purpose registers R0, R1, R2, and R3 is supplied from the decoder 60 to the controller 70 (Step 103). In Step 104, it is determined whether or not the instruction INST of concern is a multiplication instruction (MUL instruction). If the instruction INST of concern is the multiplication instruction and the multiplication execute flag MEF indicates ineffectiveness (OFF), the operation proceeds from Step 105 to Step 106 where data representing the result of the operation performed by the multiplier unit 30 is written in the substitute register 40, while the multiplication execute flag MEF is updated to indicate effectiveness (ON) and the multiplication tag MTAG is updated to indicate the write address WAd.

Even when the instruction INST of concern is the multiplication instruction, if the multiplication execute flag MEF indicates effectiveness, the operation proceeds from Step 105 to Step 107 where it is determined whether or not the write address WAd coincides with the multiplication tag MTAG. If there is a coincidence therebetween (MTAG hit), data representing the result of the operation performed by the multiplier unit 30 is written in the substitute register 40 in Step 108. In this case, the multiplication execute flag MEF is not updated since it has already indicated effectiveness. The multiplication tag MTAG is not updated, either, since the instruction INST of concern requires the overwriting of data in the same general-purpose register specified by the preceding multiplication instruction. If there is no coincidence therebetween (MTAG miss), on the other hand, the instruction INST of concern requires the writing of data in the general-purpose register different from the one specified by the preceding multiplication instruction so that the data stored in the substitute register 40 is transferred via the C bus 53 to the one of the four general-purpose registers R0, R1, R2, and R3 specified by the multiplication tag MTAG, while the multiplication tag MTAG is updated to indicate a new write address WAd and data representing the result of the operation newly performed by the multiplier unit 30 is written in the substitute register 40.

Even when the instruction INST of concern is to write data in the register file 10, if it is not a multiplication instruction (MUL instruction) but, e.g., an addition instruction (ADD instruction) or a data transfer instruction (MOV instruction) to transfer data between the general-purpose registers, the operation proceeds from Step 104 to Step 110. If the multiplication execute flag MEF indicates effectiveness and the write address WAd coincides with the multiplication tag MTAG (MTAG hit) in Step 110, the instruction INST of concern requires the overwriting of data in the same general-purpose register specified by the preceding multiplication instruction so that data representing the result of a process pertaining to the instruction INST of concern is written in the one of the four general-purpose registers specified by the write address WAd, while the multiplication execute flag MEF is updated to indicate ineffectiveness (Step 111). On the other hand, if the multiplication execute flag MEF indicates ineffectiveness or if the write address WAd does not coincide with the multiplication tag MTAG, data representing the result of the process pertaining to the instruction INST of concern is written in the one of the four general-purpose registers specified by the write address WAd without updating the multiplication execute flag MEF (Step 112).

Figure 4:
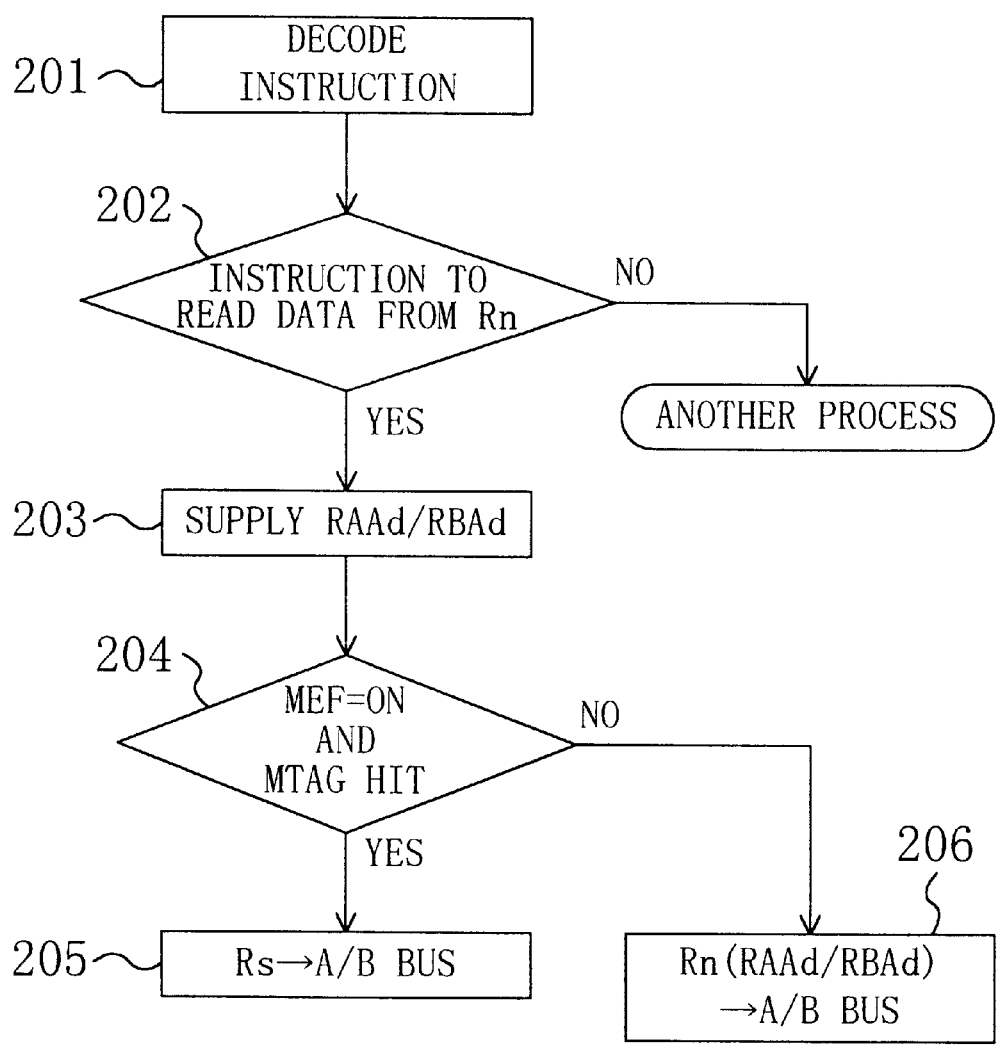
FIG. 4 is a flow chart illustrating the operation of reading data from the register file and from the substitute register of FIG. 1.

FIG. 4 shows the operation of reading data from the register file 10 and from the substitute register 40, which will be described sequentially. First, in Step 201, the given instruction INST is decoded by the decoder 60. If the instruction INST of concern is not an instruction to read data from the register file 10, the operation proceeds from Step 202 to another process. If the instruction INST of concern is to read data from the register file 10, the read address RAAd and/or RBAd for respectively specifying one of the four general-purpose registers R0, R1, R2, and R3 is supplied from the decoder 60 to the controller 70 (Step 203). At this stage, if the multiplication execute flag MEF indicates effectiveness and the read address RAAd and/or RBAd coincides with the multiplication tag MTAG (MTAG hit), the operation proceeds from Step 204 to Step 205 where the data stored in the substitute register 40 is read onto the A bus 51 and/or the B bus 52. On the other hand, if the multiplication execute flag MEF indicates ineffectiveness or if the read address RAAd and/or RBAd does not coincide with the multiplication tag MTAG, the data stored in the one of the four general-purpose registers specified by the read address RAAd and/or RBAd is read onto the A bus 51 and/or the B bus 52 (Step 206).

Figure 5:
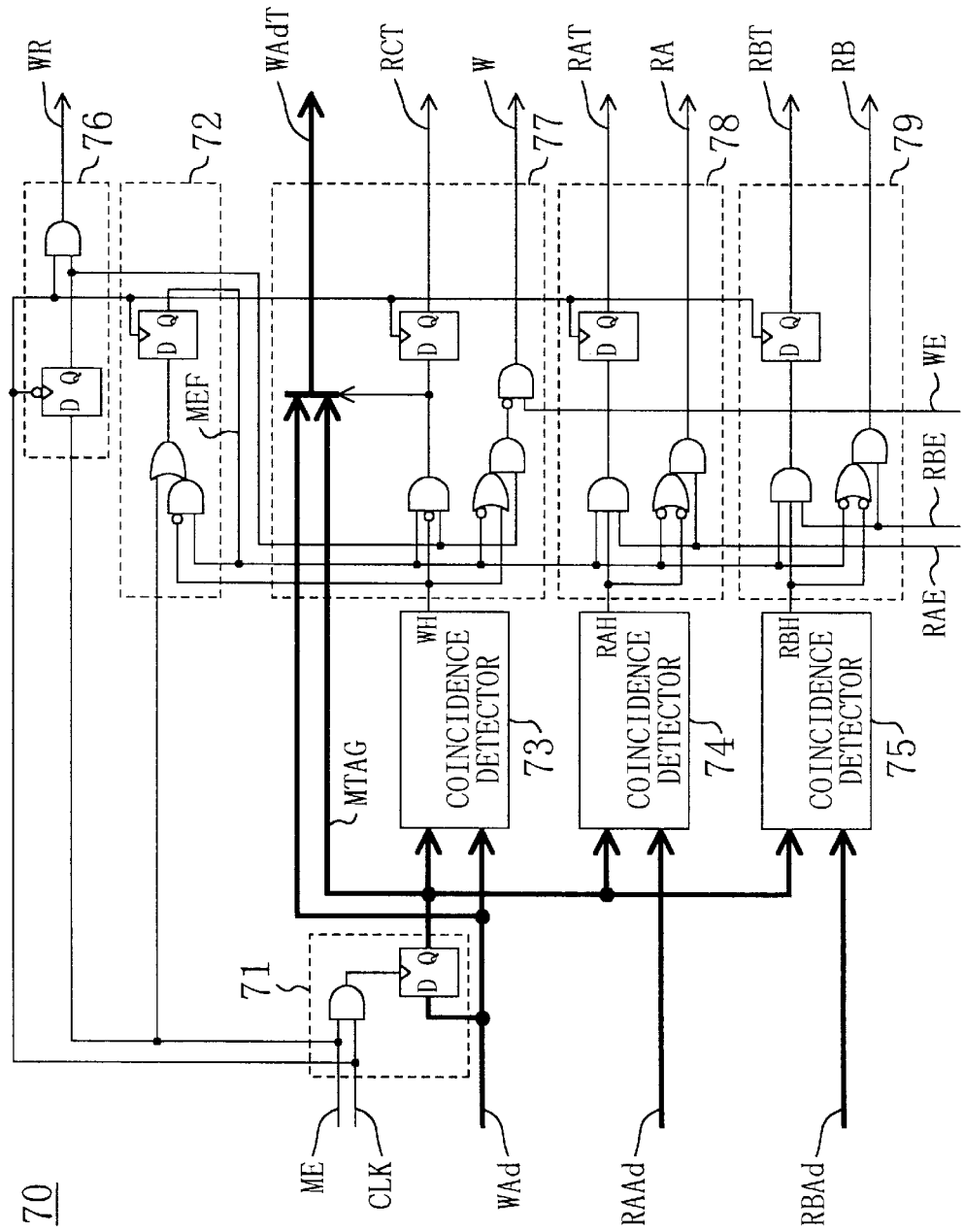
FIG. 5 is a circuit diagram showing the internal structure of a controller of FIG. 1.

FIG. 5 shows the internal structure of the controller 70 for performing the foregoing operations. The controller 70 comprises: a tag register 71 for storing the multiplication tag MTAG; a flag register 72 for storing the multiplication execute flag MEF; a first coincidence detector 73 for generating a write hit signal WH; a second coincidence detector 74 for generating a first read hit signal RAH; a third coincidence detector 75 for generating a second read hit signal RBH; a first write control circuit 76 for generating the write signal WR for the substitute register 40; a second write control circuit 77 for supplying the write address WAdT and the write signal W for the register file 10 and generating the read-to-C-bus signal RCT; a first read control circuit 78 for generating the read-to-A-bus signals RAT and RA; and a second read control circuit 79 for generating the read-to-B-bus signals RBT and RB.

The tag register 71 stores the write address WAd as the multiplication tag MTAG in synchronization with the rising edge of the clock signal CLK when the multiplication execute signal ME is issued. The flag register 72 renders the multiplication execute flag MEF effective in synchronization with the rising edge of the clock signal CLK when the multiplication execute signal ME is issued. The flag register 72 renders the multiplication execute flag MEF ineffective in synchronization with the rising edge of the clock signal CLK when the multiplication execute signal ME is not issued and the write hit signal WH is issued.

The first coincidence detector 73 issues the write hit signal WH when the write address WAd coincides with the multiplication tag MTAG. The second coincidence detector 74 issues the first read hit signal RAH when the first read address RAAd coincides with the multiplication tag MTAG. The third coincidence detector 75 issues the second read hit signal RBH when the second read address RBAd coincides with the multiplication tag MTAG.

The first write control circuit 76 stores the multiplication execute signal ME in synchronization with the falling edge of the clock signal CLK and supplies a signal representing the logical AND between the multiplication execute signal ME stored therein and the clock signal CLK as the write signal WR to the substitute register 40. The second write control circuit 77 selects the multiplication tag MTAG as the write address WAdT for the register file 10 and supplies the read-to-C-bus signal RCT to the substitute register 40 in synchronization with the rising edge of the clock signal CLK when the multiplication execute signal ME is stored in the first write control circuit 76, the multiplication execute flag MEF is effective, and the write hit signal WH is not issued. If this is not the case, the second write control circuit 77 selects the write address WAd supplied from the decoder 60 as the write address WAdT for the register file 10 without any modification. When the multiplication execute signal ME is not stored in the first write control circuit 76 or when the multiplication execute flag MEF is effective and the write hit signal WH is not issued, the second write control circuit 77 supplies the write signal W to the register file 10 provided that the write enable signal WE is issued.

The first read control circuit 78 supplies the read-to-A-bus signal RAT to the substitute register 40 in synchronization with the rising edge of the clock signal CLK provided that the first read enable signal RAE is issued when the multiplication execute flag MEF is effective and the first read hit signal RAH is issued. When the multiplication execute flag MEF is ineffective or when the first read hit signal RAH is not issued, the first read control circuit 78 supplies the read-to-A-bus signal RA to the register file 10 provided that the first read enable signal RAE is issued. The second read control circuit 79 supplies the read-to-B-bus signal RBT to the substitute register 40 in synchronization with the rising edge of the clock signal CLK provided that the second read enable signal RBE is issued when the multiplication execute flag MEF is effective and the second read hit signal RBH is issued. When the multiplication execute flag MEF is ineffective or when the second read hit signal RBH is not issued, the second read control circuit 79 supplies the read-to-B-bus signal RB to the register file 10 provided that the second read enable signal RBE is issued.

Figure 6:
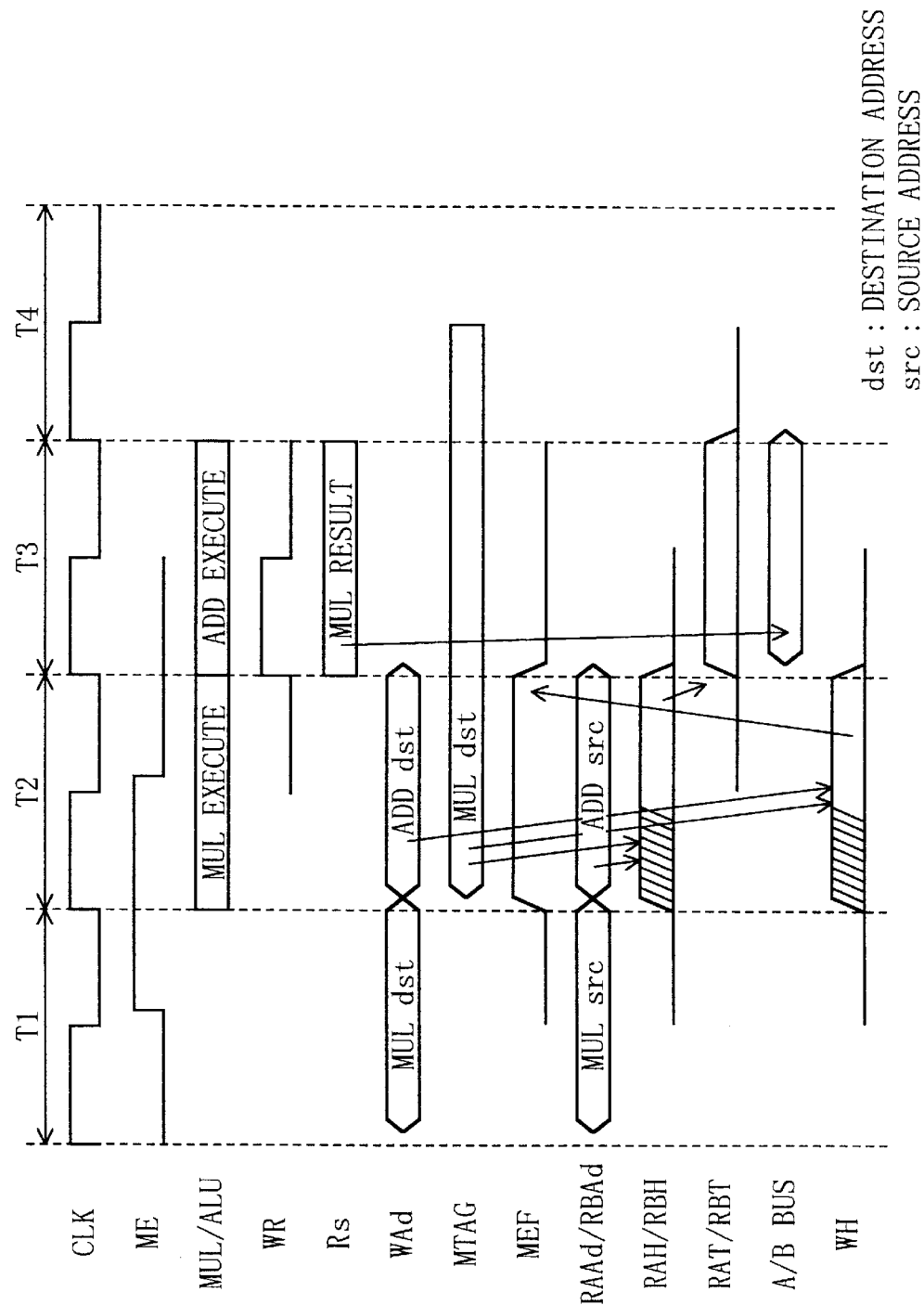
FIG. 6 is a timing chart illustrating an exemplary operation of the data processor of FIG. 1.

FIG. 6 shows a specific example of the operation of the data processor. In the example, it is assumed that the following two instructions are sequentially executed.

MUL R0, R1, R2

ADD R0, R0, R3

The first instruction (MUL instruction) requires that the multiplier unit 30 perform the multiplication of data stored in the general-purpose register R1 and data stored in the general-purpose register R2 and that data representing the result of the multiplication be written in the general-purpose register R0. That is, the first instruction is a multiplication instruction accompanied by 1 and 2 as first and second source addresses (MUL src), respectively, and by 0 as a destination address (MUL dst). The second instruction (ADD instruction) requires that the arithmetic and logic unit 20 perform the addition of data stored in the general-purpose register R0 and data stored in the general-purpose register R3 and that data representing the result of the addition be written in the general-purpose register R0. That is, the second instruction is an addition instruction accompanied by 0 and 3 as first and second source addresses (ADD src), respectively, and by 0 as a destination address (ADD dst).

According to FIG. 6, the decoder 60 decodes the MUL instruction in a cycle T1. As a result of decoding, RAAd=1,RBAd=2, WAd=0, and ME=1 are satisfied. In a cycle T2, the multiplier unit 30 executes the MUL instruction, while the decoder 60 decodes the ADD instruction. As a result of decoding, RAAd =0, RBAd=3, WAd=0, and ME=0 are satisfied. In a cycle T3, the arithmetic and logic unit 20 executes the ADD instruction.

Additionally, the write address WAd pertaining to the MUL instruction is stored as the multiplication tag MTAG and the multiplication execute flag MEF is rendered effective in the cycle T2, as shown in FIG. 6. Furthermore, the write signal WR is generated in the cycle T3 such that data representing the result of the multiplication performed in the cycle T2 is stored in the substitute register 40 in place of the general-purpose register R0 (see Step 106 in FIG. 3). The second coincidence detector 74 detects a coincidence between the first read address RAAd pertaining to the ADD instruction and the multiplication tag MTAG and issues the first read hit signal RAH in the cycle T2. Consequently, the read-to-A-bus signal RAT is issued in the cycle T3, so that the first operand of the ADD instruction is supplied from the substitute register 40, in place of the general-purpose register R0, to the arithmetic and logic unit 20 via the A bus 51 (see Step 205 in FIG. 4). The third coincidence detector 75 detects no coincidence between the second read address RBAd pertaining to the ADD instruction and the multiplication tag MTAG in the cycle T2 and therefore the second read hit signal RBH is not issued. As a result, the second operand of the ADD instruction is supplied from the general-purpose register R3 in the register file 10 to the arithmetic and logic unit 20 via the B bus 52 (see Step 206 in FIG. 4). The first coincidence detector 73 detects a coincidence between the write address WAd pertaining to the ADD instruction and the multiplication tag MTAG and issues the write hit signal WH in the cycle T2. Accordingly, the multiplication execute flag MEF is rendered ineffective in the cycle T3 (see Step 111 in FIG. 3).

FIG. 7 shows another specific example of the operation of the data processor of FIG. 1. In the example, it is assumed that the following two instructions are sequentially executed.

MUL R0, R1, R2

MUL R1, R0, R3

The first instruction (MUL0 instruction) requires that the multiplier unit 30 perform the multiplication of data stored in the general-purpose register R1 and data stored in the general-purpose register R2 and that data representing the result of the multiplication be written in the general-purpose register R0. That is, the first instruction is a multiplication instruction accompanied by 1 and 2 as first and second source addresses (MUL0 src), respectively, and by 0 as a destination address (MUL0 dst). The second instruction (MUL1 instruction) requires that the multiplier unit 30 perform the multiplication of data stored in the general-purpose register R0 and data stored in the general-purpose register R3 and that data representing the result of the multiplication be written in the general-purpose register R1. That is, the second instruction is a multiplication instruction accompanied by 0 and 3 as first and second source addresses (MUL1 src), respectively, and by 1 as a destination address (MUL1 dst).

According to FIG. 7, the MUL0 instruction is decoded by the decoder 60 in a cycle T1. As a result of decoding, RAAd=1, RBAd=2, WAd=0, and ME=1 are satisfied. In a cycle T2, the multiplier unit 30 executes the MUL0 instruction, while the decoder 60 decodes the MUL1 instruction. As a result of decoding, RAAd=0, RBAd=3, WAd=1, and ME=1 are satisfied. The multiplier unit (MUL) 30 executes the MUL1 instruction in a cycle T3.

Additionally, the write address WAd pertaining to the MUL0 instruction is stored as the multiplication tag MTAG and the multiplication execute flag MEF is rendered effective in the cycle T2, as shown in FIG. 7. Furthermore, the write signal WR is generated in the cycle T3 such that data representing the result of the multiplication pertaining to the MUL0 instruction performed in the cycle T2 is stored in the substitute register 40 in place of the general-purpose register R0. The second coincidence detector 74 detects a coincidence between the first read address RAAD pertaining to the MUL1 instruction and the multiplication tag MTAG and issues the first read hit signal RAH in the cycle T2. Consequently, the read-to-A-bus signal RAT is issued in the cycle T3 so that the first operand of the MUL1 instruction is supplied from the substitute register 40, in place of the general-purpose register R0, to the multiplier unit 30 via the A bus 51. The third coincidence detector 75 detects no coincidence between the second read address RBAd pertaining to the MUL1 instruction and the multiplication tag MTAG in the cycle T2 and therefore the second read hit signal RBH is not issued. As a result, the second operand of the MUL1 instruction is supplied from the general-purpose register R3 in the register file 10 to the multiplier unit 30 via the B bus 52. The first coincidence detector 73 detects no coincidence between the write address WAd pertaining to the MUL1 instruction and the multiplication tag MTAG in the cycle T2 and therefore the write hit signal WH is not issued. Accordingly, the read-to-C-bus signal RCT is issued in the cycle T3 so that the result of multiplication pertaining to the MUL0 instruction stored in the substitute register 40 is transferred to the register file 10 via the C bus 53 and the result of multiplication is written in the general-purpose register R0 specified by the multiplication tag MTAG. In the cycle T3, the multiplication tag MTAG is also updated to indicate the write address WAd pertaining to the MUL1 instruction. In a cycle T4, the write signal WR is generated such that data representing the result of the multiplication pertaining to the MUL1 instruction performed in the cycle T3 is stored in the substitute register 40 in place of the general-purpose register R1 (see Step 107 in FIG. 3).

As described above, the data processor of FIG. 1 is so constituted as to have the substitute register 40 for storing only data representing the result of the operation performed by the multiplier unit 30 in place of any of the four general-purpose registers R0, R1, R2, and R3 in the register file 10, the substitute register 40 being disposed in the vicinity of the multiplier unit 30. However, it is also possible to provide a substitute register for storing only data representing the result of operation performed by, e.g., a divider unit. Alternatively, a single substitute register may be used in common by the multiplier unit and the divider unit. In this case, the substitute register stores only data representing the result of operation performed by a multiplier/divider unit consisting of the multiplier unit and the divider unit. It is to be noted that the number of general-purpose registers contained in the register file 10 is arbitrary.

Finally, a specific description will be given to the extent to which the processing speed of the data processor of FIG. 1 is improved by using the substitute register 40. If it is assumed that data representing the result of the operation performed by the multiplier unit 30 is no more written in the substitute register 40 disposed in the vicinity of the multiplier unit 30 but written directly in the register file 10 via the C bus 53, a significant delay occurs in data transfer via the C bus 53. If the placement and routing of the buses is assumed to be conducted in accordance with 0.35 $\mu$m rule process technology, the upper-limit frequency of the clock signal CLK in the case where the substitute register 40 is not used is, e.g., 90.9 MHz. By contrast, the frequency of the clock signal CLK can be increased to 100 MHz under the same conditions in the case of using the substitute register 40. Thus, the clock rate can be improved by 10%. Since wiring delay will become predominant among delay factors in LSIs as an increasingly reduced rule process technology is used, it is considered that the present invention will exert an ever-increasing effect.

What is claimed is:

1. A data processor comprising:

a register file having a plurality of general-purpose registers each for storing data;

a plurality of operational units each for exchanging data with said register file and performing an operation designated by an instruction corresponding thereto;

a substitute register for storing data representing the result of the operation performed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and when an instruction designating the operation to be performed by said specific operational unit is given, said instruction being accompanied by a write address for specifying which one of said plurality of general-purpose registers should store the result of said designated operation, and the flag of said flag register indicates ineffectiveness, controlling said substitute register such that data representing the result of the operation performed by said specific operational unit is written therein;

updating the flag of said flag register such that effectiveness is indicated thereby; and updating the tag of said tag register such that said write address is indicated thereby.

2. A data processor comprising:

a register file having a plurality of general-purpose registers each for storing data;

a plurality of operational units each for exchanging data with said register file and performing an operation designated by an instruction corresponding thereto;

a substitute register for storing data representing the result of the operation preformed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and wherein said controller exerts the function of,
when an instruction designating the operation to be performed by said specific operational unit is given, said instruction being accompanied by a write address for specifying which one of said plurality of general-purpose registers should store the result of said designated operation, the flag of said flag register indicates effectiveness, and said write address coincides with the tag of said tag register, controlling said substitute register such that data representing the result of the operation performed by said specific operational unit is written therein without updating the flag of said flag register nor the tag of said tag register.

3. A data processor comprising:

a register file having a plurality of general-purpose registers each for storing data;

a plurality of operational units each for exchanging data with said register file and performing an operation designated by an instruction corresponding thereto;

a substitute register for storing data representing the result of the operation performed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and wherein said controller exerts the functions of:
when an instruction designating the operation to be performed by said specific operational unit is given, said instruction being accompanied by a write address for specifying which one of said plurality of general purpose registers should store the result of said designated operation, the flag of said flag register indicates effectiveness, and said write address does not coincide with the tag of said tag register, controlling said substitute register such that the data stored therein is transferred to the one of said plurality of general purpose registers specified by the tag of said tag register;

updating the tag of said tag register such that said write address is indicated thereby; and controlling said substitute register such that data representing the result of the operation performed by said specific operational unit is written therein.

4. A data processor comprising:

a register file having a plurality of general-purpose registers each for storing data;

a plurality of operational units each for exchanging data with said register file and performing an operation designated by an instruction corresponding thereto;

a substitute register for storing data representing the result of the operation performed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and wherein said controller exerts the functions of:
when an instruction designating a process other than the operation to be performed by said specific operational unit is given, said instruction being accompanied by a write address for specifying which one of said plurality of general-purpose registers should store the result of said designated process, the flag of said flag register indicates effectiveness, and said write address coincides with the tag of said tag register, controlling the one of said plurality of general-purpose registers specified by said write address such that data representing the result of said designated process is written therein; and updating the flag of said flag register such that ineffectiveness is indicated thereby.

5. A data processor comprising:

a register file having a plurality of general-purpose registers each for storing data;

a plurality of operational units each for exchanging data with said register file and performing an operation designated by an instruction corresponding thereto;

a substitute register for storing data representing the result of the operation performed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and wherein said controller exerts the function of,
when an instruction designating a process other than the operation to be performed by said specific operational unit is given, said instruction being accompanied by a write address for specifying which one of said plurality of general-purpose registers should store the result of said designated process, and the flag of said flag register indicates ineffectiveness or said write address does not coincide with the tag of said tag register, controlling the one of said plurality of general purpose registers specified by said write address such that data representing the result of said designated process is written therein without updating the flag of said flag register.

6. A data processor comprising:

register file having a plurality of general-purpose registers each for storing data;

a plurality of operational units each for exchanging data with said register file and performing an operation designated by an instruction corresponding thereto;

a substitute register for storing data representing the result of the operation performed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and wherein said controller exerts the function of, when an instruction accompanied by a read address for specifying from which one of said plurality of general-purpose registers data should be read is given, the flag of said flag register indicates effectiveness, and said read address coincides with the tag of said tag register, controlling said substitute register such that the data stored therein is read therefrom.

7. A data processor comprising:

a register file having a plurality of general-purpose registers each for storing data;

a plurality of operational units each for exchanging data with said register file and performing an operation designated by an instruction corresponding thereto;

a substitute register for storing data representing the result of the operation performed by a specific one of said plurality of operational units in place of any of said plurality of general-purpose registers; and a controller for controlling the writing of data in said register file, the reading of data stored in said register file, the writing of data in said substitute register, and the reading of data stored in said substitute register, said controller having a tag register for storing a tag indicative of which one of said plurality of general purpose registers is substituted by said substitute register, wherein said controller further has a flag register for storing a flag indicative of whether data stored in said substitute register is effective or ineffective, and wherein said controller exerts the function of, when an instruction accompanied by a read address for specifying from which one of said plurality of general-purpose registers data should be read is given and the flag of said flag register indicates ineffectiveness or said read address does not coincide with the tag of said tag register, controlling the one of said plurality of general-purpose registers specified by said read address such that the data stored therein is read therefrom.

* * * * *